(12) United States Patent
Li et al.

(10) Patent No.: US 11,659,613 B2
(45) Date of Patent: *May 23, 2023

(54) COMMUNICATION METHOD AND COMMUNICATION APPARATUS

(71) Applicant: HUAWEI TECHNOLOGIES CO., LTD., Guangdong (CN)

(72) Inventors: Bingzhao Li, Beijing (CN); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

This patent is subject to a terminal disclaimer.

(21) Appl. No.: 17/009,731

(22) Filed: Sep. 1, 2020

(65) Prior Publication Data
US 2020/0404730 A1    Dec. 24, 2020

Related U.S. Application Data

(63) Continuation of application No. 16/522,373, filed on Jul. 25, 2019, now Pat. No. 10,798,771, which is a
(Continued)

(51) Int. Cl.
*H04W 76/19* (2018.01)
*H04W 76/11* (2018.01)
(Continued)

(52) U.S. Cl.
CPC ......... *H04W 76/19* (2018.02); *H04W 64/003* (2013.01); *H04W 68/02* (2013.01); *H04W 76/11* (2018.02); *H04W 76/27* (2018.02)

(58) Field of Classification Search
CPC ..... H04W 76/19; H04W 76/11; H04W 76/27; H04W 64/003; H04W 68/02
See application file for complete search history.

(56) References Cited

U.S. PATENT DOCUMENTS

2013/0039339 A1  2/2013  Rayavarapu et al.
2016/0278160 A1  9/2016  Schliwa-Bertling et al.
(Continued)

FOREIGN PATENT DOCUMENTS

CN   101365228 A   2/2009
CN   102932857 A   2/2013
(Continued)

OTHER PUBLICATIONS

3GPP TS 24.301 V14.2.0 (Dec. 2016), 3rd Generation Partnership Project;Technical Specification Group Core Network and Terminals;Non-Access-Stratum (NAS) protocol for Evolved Packet System (EPS); Stage 3(Release 14), 470 pages.
(Continued)

*Primary Examiner* — Kevin M Cunningham
(74) *Attorney, Agent, or Firm* — Slater Matsil, LLP

(57) ABSTRACT

This application provides a communication method and a communications apparatus. A terminal in an inactive state receives a paging message, and content in the paging message is determined. When the content includes a first identity of the terminal, the terminal sends a first request message to a first access network device, where the first request message carries a non-access stratum (NAS) identifier of the terminal. When the content includes a second identity of the terminal and an identity of an anchor access network device, the terminal sends a second request message to the first access network device. The communication method of is application can adapt to a communication requirement of a terminal in an inactive state.

21 Claims, 7 Drawing Sheets

Related U.S. Application Data continuation of application No. PCT/CN2017/072673, filed on Jan. 25, 2017.

(51) Int. Cl.
*H04W 76/27* (2018.01)
*H04W 64/00* (2009.01)
*H04W 68/02* (2009.01)

(56) References Cited

U.S. PATENT DOCUMENTS

| | | | |
|---|---|---|---|
| 2018/0049244 | A1 | 2/2018 | Lee |
| 2018/0139778 | A1 | 5/2018 | Chou et al. |
| 2019/0082490 | A1 | 3/2019 | Zhang et al. |
| 2019/0174571 | A1 | 6/2019 | Deenoo et al. |
| 2019/0254109 | A1* | 8/2019 | Lee .................. H04W 76/27 |

FOREIGN PATENT DOCUMENTS

| | | | |
|---|---|---|---|
| CN | 103858512 | A | 6/2014 |
| CN | 103858513 | A | 6/2014 |
| CN | 105898894 | A | 8/2016 |
| CN | 106102106 | A | 11/2016 |
| JP | 2015207884 | A | 11/2015 |
| KR | 20150079940 | A | 7/2015 |
| RU | 2446637 | C2 | 3/2012 |
| WO | 2014071599 | A1 | 5/2014 |
| WO | 2018031603 | A1 | 2/2018 |

OTHER PUBLICATIONS

3GPP TS 36.300 V14.1.0: 3rd Generation Partnership Project; Technical Specification Group Radio Access Network; Evolved Universal Terrestrial Radio Access (E-UTRA) and Evolved Universal Terrestrial Radio Access Network (E-UTRAN);Overall description;Stage 2(Release 14), Dec. 2016, total 317 pages.
InterDigital Communications, RAN Paging in the Inactive State. 3GPP TSG-RAN WG2 NR Ad Hoc Spokane, USA, Jan. 17-19, 2017, R2-1700518, 3 pages.
CATT, CN and RAN Paging for UE in RRC_INACTIVE. 3GPP TSG-RAN WG2 NR Ad Hoc Spokane, USA, Jan. 17-19, 2017, R2-1700630, 2 pages.
3GPP TS 36.304 V14.1.0 (Dec. 2016);3rd Generation Partnership Project;Technical Specification Group Radio Access Network;Evolved Universal Terrestrial Radio Access (E-UTRA); User Equipment (UE) procedures in idle mode (Release 14),total 46 pgaes.
Huawei,"UL data transmission without RRC signalling without initiating transition to active (option A)",3GPP TSG-RAN NR Adhoc R2-1700185,Spokane (WA), USA, Nov. 14-18, 2016,Total 25 Pages.
Ericsson: "RRC state machine and RRC Inactive characteristics", 3GPP TSG-RAN WG2 adhoc, Tdoc R2-1700535, Spokane USA, Jan. 17-19, 2017, total 11 pages. XP051211107.
Qualcomm Incorporated:"NR RRC Inactive State principles—UE ID", 3GPP TSG-RAN WG3 Meeting #94, R3-163029, Reno, US, Nov. 14-18, 2016. total 3 pages. XP051179128.
Ericsson: "Further considerations on RAN and CN paging in Inactive", 3GPP TSG-RAN WG2 #97, Tdoc R2-1700893, Athens, Greece, Feb. 13-17, 2017. total 6 pages, XP051211672.
Ericsson, Signalling flows for paging and resume for RRC_INACTIVE. 3GPP TSG-RAN WG2-AH Spokane, Washington, U.S., Jan. 17-19, 2017, R2-1700536. 7 pages.
3GPP TS 23.501 V0.0.0 (Jan. 2017), 3rd Generation Partnership Project;Technical Specification Group Services and System Aspects-;System Architecture for the 5G System;Stage 2;(Release 15), Jan. 23, 2017. total 14 pages.
3GPP TS 23.401 V14.2.0 (Dec. 2016), 3rd Generation Partnership Project;Technical Specification Group Services and System Aspects;General Packet Radio Service (GPRS) enhancements for Evolved Universal Terrestrial Radio Access Network (E-UTRAN) access(Release 14), Dec. 2016. total 385 pages.
3GPP TS 36.331 V14.1.0 (Dec. 2016), 3rd Generation Partnership Project;Technical Specification Group Radio Access Network;Evolved Universal Terrestrial Radio Access (E-UTRA);Radio Resource Control (RRC);Protocol specification (Release 14), Dec. 2016. total 653 pages.
3GPP TS 36.413 V14.1.0 (Jan. 2017), 3rd Generation Partnership Project;Technical Specification Group Radio Access Network;Evolved Universal Terrestrial Radio Access Network(E-UTRAN);S1 Application Protocol (S1AP)(Release 14), Jan. 2017. total 333 pages.
Huawei, et al., "The functions of light connection", 3GPP TSG RAN WG2 Meeting #95, R2-165246, Aug. 22-26, 2016, 4 Pages, Gothenburg, Sweden.
Intel Corporation, "Light Connection signaling and UE's modeling", 3GPP TSG RAN WG2 Meeting #95bis, R2-166687, Oct. 10-14, 2016, 8 Pages, Kaohsiung.
Kyocera, "UE behaviour and signalling for Light Connection", 3GPP TSG-RAN WG2 #95bis, R2-166858, Oct. 10-14, 2016, 8 Pages, Kaohsiung, Taiwan.

* cited by examiner

COMMUNICATION METHOD AND COMMUNICATION APPARATUS

CROSS-REFERENCE TO RELATED APPLICATIONS

This application is a continuation of U.S. patent application Ser. No. 16/522,373, filed on Jul. 25, 2019, now U.S. Pat. No. 10,798,771 issued on Oct. 6, 2020, which is a continuation of International Application No. PCT/CN2017/072673, filed on Jan. 25, 2017. All of the afore-mentioned patent applications are hereby incorporated by reference in their entireties.

TECHNICAL FIELD

This application relates to the communications field, and in particular, to communication methods and communication apparatuses.

BACKGROUND

With development of communications technologies, terminal devices start to have a third state in addition to a connected state and an idle state. The third state is a state in which the terminal device stores context information of the terminal device and can perform a cell reselection operation, and an anchor access network device stores connection information of the terminal device. The connection information of the terminal device includes the context information of the terminal device and a core network connection of the terminal device.

When the terminal device is in the third state, and when the terminal device receives paging from a network side or the terminal device needs to send uplink data, the terminal device sends a connection restoration message to a first access network device corresponding to a cell in which the terminal device is currently located. The connection restoration message carries a first identity of the terminal device and a first identity of the anchor access network device (As used herein and throughout the application, the word "identity" means a parameter that uniquely identifies an object). The first identity of the anchor access network device is used to identify the anchor access network device in a first network, and the first network is a part of a second network. The first access network device receives the connection restoration message. If the first access network device is not the anchor access network device, the first access network device determines, based on the first identity of the anchor access network device, whether the first access network device is connected to the anchor access network device. If the first access network device is connected to the anchor access network device, the first access network device obtains the context information of the terminal device from the anchor access network device based on the first identity of the terminal device, and establishes a connection to the terminal device based on the context information. If the first access network device is not connected to the anchor access network device, the first access network device performs a plurality of signaling interactions with the terminal device, to establish a connection to the terminal device. Then a core network may send data to the terminal device by using the first access network device.

It is noticed that existing communication mechanisms cannot satisfy a process change caused by the introduction of the third state in a terminal.

SUMMARY

Embodiments of this application provide communication methods and communications apparatuses, to adapt to communication requirements of terminals in a third state. Technical solutions are described herein.

According to a first aspect, this application discloses a communication method. In the method, a first access network device receives a connection restoration message from a terminal device, where the connection restoration message carries a first identity of an anchor access network device. The anchor access network device stores context information of the terminal device. The first identity of the anchor access network device is used to identify the anchor access network device in a first network, and the first network is a part of a second network. The first access network device sends a connection establishment message to the terminal device based on the first identity of the anchor access network device, where the connection establishment message is used to request connection information of the anchor access network device. The first access network device obtains the connection information of the anchor access network device, where the connection information is used to identify the anchor access network device in the second network. In this way, the first access network device may obtain the connection information of the anchor access network device. When there is another terminal device that belongs to the same anchor access network device as the terminal device, the first access network device may obtain context information of the another terminal device from the anchor access network device based on the currently obtained connection information. This avoids wasting the context information of the another terminal device that is stored on the anchor access network device, and adapts to a communication requirement of a terminal in a third state.

In a possible implementation of the first aspect, the connection information includes the first identity and a second identity of the anchor access network device. The second identity is used to identify the first network in which the anchor access network device is located. The connection establishment message carries first instruction information, where the first instruction information is used to instruct the terminal device to send the second identity of the anchor access network device. The first access network device receives a connection establishment complete message from the terminal device, and obtains the first identity of the anchor access network device that is carried in the connection restoration message, where the connection establishment complete message carries the second identity of the anchor access network device. The first access network device controls, by using the first instruction information, the terminal device to send the second identity of the anchor access network device, so that the first access network device can successfully obtain the connection information of the anchor access network device.

In a possible implementation of the first aspect, the connection information includes a third identity of the anchor access network device, where the third identity is used to identify the anchor access network device in the second network. The connection establishment message carries first instruction information, where the first instruction information is used to instruct the terminal device to send a second identity of the anchor access network device. The first access network device receives a connection establishment complete message from the terminal device, and obtains the third identity of the anchor access network device based on the first identity and the second identity, where the connection establishment complete message carries the second identity of the anchor access network device. The first access network device controls, by using the first instruction information, the terminal device to send the second identity of the anchor access network device, so that the first access network device can successfully obtain the connection information of the anchor access network device. In addition, because a connection can be directly established to the anchor access network device based on the third identity of the anchor access network device, when context information of another terminal is obtained from the anchor access network device, a connection can be quickly established to the anchor access network device, thereby improving efficiency of obtaining the context information.

In a possible implementation of the first aspect, the connection restoration message carries a part of information in the first identity of the anchor access network device, the connection establishment complete message further carries a remaining part of information in the first identity of the anchor access network device. The first access network device combines the part of information in the first identity of the anchor access network device and the remaining part of information in the first identity of the anchor access network device to form the first identity of the anchor access network device. Because the connection restoration message carries a part of information in the first identity of the anchor access network device, a data transmission amount can be reduced.

In a possible implementation of the first aspect, the connection information includes a third identity of the anchor access network device, where the third identity is used to identify the anchor access network device in the second network. The connection establishment message carries second instruction information, where the second instruction information is used to instruct the terminal device to send the third identity of the anchor access network device. The first access network device receives a connection establishment complete message from the terminal device, where the connection establishment complete message carries the third identity of the anchor access network device. The first access network device controls, by using the second instruction information, the terminal device to send the third identity of the anchor access network device, so that the first access network device can successfully obtain the connection information of the anchor access network device. In addition, because a connection can be directly established to the anchor access network device based on the third identity of the anchor access network device, when context information of another terminal is obtained from the anchor access network device, a connection can be quickly established to the anchor access network device, thereby improving efficiency of obtaining the context information.

In a possible implementation of the first aspect, after obtaining the connection information of the anchor access network device, the first access network device may establish a connection to the anchor access network device based on the connection information of the anchor access network device. In this way, during obtaining the context information of the terminal device from the anchor access network device, the context information of the terminal device can be directly obtained from the anchor access network device based on the connection, thereby improving efficiency of obtaining the context information.

In a possible implementation of the first aspect, the first access network device determines whether the anchor access network device can be determined based on the first identity of the anchor access network device. If the first access network device determines that the anchor access network device cannot be determined based on the first identity of the anchor access network device, the first access network device performs the operation of sending a connection establishment message to the terminal device. When the first access network device cannot determine the anchor access network device based on the first identity of the anchor access network device, the first access network device sends the connection establishment message to the terminal device. The connection establishment message requests the terminal device to establish a connection, thereby ensuring that context information in the anchor access network device is preferentially used to establish a connection.

In a possible implementation of the first aspect, when the first access network device determines, based on the first identity of the anchor access network device, that the first access network device is not the anchor access network device, and the first access network device does not have the connection information of the anchor access network device, the first access network device determines that the anchor access network device cannot be determined based on the first identity of the anchor access network device. This implements a manner of determining whether the anchor access network device can be determined based on the first identity of the anchor access network device.

According to a second aspect, this application provides a communication method. A terminal device sends a connection restoration message to a first access network device, where the connection restoration message carries a first identity of an anchor access network device. The first identity of the anchor access network device is used to identify the anchor access network device in a first network, and the first network is a part of a second network. The terminal device receives a connection establishment message in response to the connection restoration message. The terminal device sends a connection establishment complete message to the first access network device, where the connection establishment complete message is used to obtain connection information of the anchor access network device, and the connection information is used to identify the anchor access network device in the second network. In this way, the first access network device can obtain the connection information of the anchor access network device. When there is another terminal device that belongs to the same anchor access network device as the terminal device, the first access network device may obtain context information of the another terminal device from the anchor access network device based on the currently obtained connection information. This avoids wasting the context information of the another terminal device that is stored on the anchor access network device.

In a possible implementation of the second aspect, the connection establishment message carries first instruction information. The first instruction information is used to instruct the terminal device to send a second identity of the anchor access network device, and the second identity is used to identify the first network in which the anchor access network device is located. The terminal device sends the connection establishment complete message to the first access network device based on the first instruction information, where the connection establishment complete message carries the second identity of the anchor access network device. In this way, the terminal device can determine a requirement of the first access network device based on the first instruction information, and send required information to the first access network device, so that the first access network device can obtain the connection information of the anchor access network device.

In a possible implementation of the second aspect, the connection restoration message carries a part of information in the first identity of the anchor access network device, and the connection establishment complete message further carries a remaining part of information in the first identity of the anchor access network device. Because the connection restoration message can carry a part of information in the first identity of the anchor access network device, a data transmission amount can be reduced.

In a possible implementation of the second aspect, the connection establishment message carries second instruction information, where the second instruction information is used to instruct the terminal device to send a third identity of the anchor access network device. The terminal device sends the connection establishment complete message to the first access network device based on the second instruction information, where the connection establishment complete message carries the third identity of the anchor access network device. In this way, the terminal device can determine a requirement of the first access network device based on the second instruction information, and send required information to the first access network device, so that the first access network device can obtain the connection information of the anchor access network device.

In a possible implementation of the second aspect, the terminal device receives the third identity of the anchor access network device when entering a third state. This can ensure that the terminal device can successfully send the third identity of the anchor access network device to the first access network device based on the second instruction information.

According to a third aspect, this application provides a communication method. In the method, a terminal device receives a paging message, where the terminal device is in a third state. The terminal device determines content carried in the paging message. When the carried content is a first identity of the terminal device and a first identity of an anchor access network device, the terminal device sends a connection restoration message to a first access network device corresponding to a cell in which the terminal device is currently located. The connection restoration message carries the first identity of the terminal device and the first identity of the anchor access network device. The connection restoration message is used by the first access network device to establish a connection to the terminal device. The first identity of the terminal device is used to identify the terminal device on the anchor access network device. The first identity of the anchor access network device is used to identify the anchor access network device in an access network. When the carried content is a second identity of the terminal device, the terminal device sends a connection establishment request message to the first access network device. The connection establishment request message carries a non-access stratum (NAS) identifier of the terminal device. The first access network device uses the connection establishment request message to establish a connection to the terminal device. The second identity of the terminal device is used to identify the terminal device in a core network. The terminal device determines, based on the content carried in the paging message, whether paging is initiated by the core network or an access network device, and further initiates different paging response processes based on different paging devices. This can ensure that a connection between the terminal device and the core network can be successfully restored as quickly as possible.

According to a fourth aspect, an embodiment of this application provides a communications apparatus, configured to perform the method according to any one of the first aspect or the possible implementations of the first aspect. Specifically, the apparatus includes units configured to perform the method according to any one of the first aspect or the possible implementations of the first aspect.

According to a fifth aspect, an embodiment of this application provides a communications apparatus, configured to perform the method according to any one of the second aspect or the possible implementations of the second aspect. Specifically, the apparatus includes units configured to perform the method according to any one of the second aspect or the possible implementations of the second aspect.

According to a sixth aspect, an embodiment of this application provides a communications apparatus, configured to perform the method according to the third aspect. Specifically, the apparatus includes units configured to perform the method according to the third aspect.

According to a seventh aspect, an embodiment of this application provides a communications apparatus, where the apparatus includes an input interface, an output interface, a processor, and a memory. The input interface, the output interface, the processor, and the memory may be connected to each other by using a bus system. The memory is configured to store a program, an instruction, or code. The processor is configured to execute the program, the instruction, or the code in the memory, to perform the method according to any one of the first aspect or the possible implementations of the first aspect.

According to an eighth aspect, an embodiment of this application provides a communications apparatus, where the apparatus includes a receiver, a transmitter, a processor, and a memory. The receiver, the transmitter, the processor, and the memory may be connected to each other by using a bus system. The memory is configured to store a program, an instruction, or code. The processor is configured to execute the program, the instruction, or the code in the memory, to perform the method according to any one of the second aspect or the possible implementations of the second aspect, or the third aspect.

According to a ninth aspect, an embodiment of this application provides a communications system, where the system includes the apparatus according to the fourth aspect or the seventh aspect, and the apparatus according to the fifth aspect or the eighth aspect.

According to a tenth aspect, an embodiment of this application provides a computer readable storage medium, configured to store a computer program. The computer program is used to perform the method according to any one of the first aspect or the possible implementations of the first aspect, any one of the second aspect or the possible implementations of the second aspect, or the third aspect.

DESCRIPTION OF EMBODIMENTS

Figure 1A:
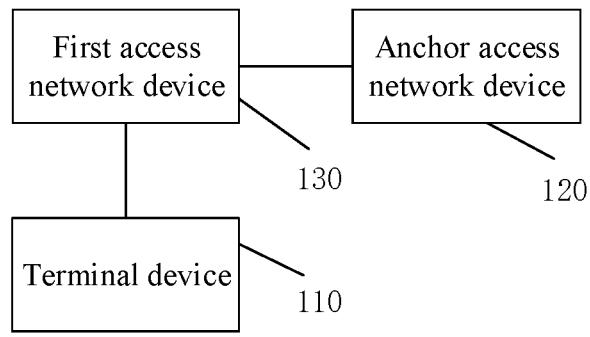
FIG. 1A is a schematic diagram of a network architecture.

A terminal device has a third state in addition to a connected state and an idle state. When the terminal device is in the connected state, the terminal device stores context information of the terminal device, and may perform handover based on control of a network device. When the terminal device is in the idle state, the terminal device releases the context information of the terminal device, and may perform cell-based reselection. When the terminal device is in the third state, the terminal device stores the context information of the terminal device, and may perform cell-based reselection. In addition, connection information of the terminal device is stored in an anchor base station. The connection information of the terminal device includes the context information of the terminal device and a core network connection of the terminal device.

When the terminal device is in the third state, the terminal device stores management area information configured by an anchor access network device, and needs to notify the anchor access network device when the terminal device moves out of a management area corresponding to the management area information. The third state may be referred to as an inactive state, a light-connected state, a deactivated state, or a low-overhead state. This is not limited herein. The management area may be referred to as a paging area or an access network location tracking area. This is not limited herein. An access network device may be a base station, a radio access network (RAN) device, or another device that the terminal device accesses and a corresponding controller.

When the terminal device starts to enter the third state, the anchor access network device configures the management area for the terminal device. The management area includes a cell of the anchor access network device that the terminal device accesses, and one or more other cells different from the cell. The terminal device does not need to notify a network side of a location of the terminal device when the terminal device moves within the management area, and needs to notify the network side of the location of the terminal device when the terminal device moves out of the management area. Therefore, when the terminal device is in the third state, the terminal device may be located in the cell of the anchor access network device, or may be located in a cell of another access network device.

When the terminal device starts to enter the idle state, a core network configures a tracking area for the terminal device. The tracking area includes at least one cell. The terminal device does not need to notify a device in the core network of a location of the terminal device when the terminal device moves within the tracking area, and needs to notify the device in the core network of the location of the terminal device when the terminal device moves out of the tracking area. The device in the core network may be a mobility management entity (MIME) or the like.

When a first access network device is not connected to the anchor access network device, and another terminal device that belongs to the same anchor access network device as the terminal device sends a connection restoration message to the first access network device, the first access network device cannot obtain context information of the another terminal device stored on the anchor access network device or establish a connection to the another terminal device by using the context information, either. Consequently, the context information stored on the anchor access network device is wasted.

FIG. 1A shows a network architecture according to an embodiment of this application. The network architecture includes a terminal device 110, an anchor access network device 120, and a first access network device 130.

When the terminal device 110 is in a third state, the anchor access network device 120 includes context information of the terminal device 110. The first access network device 130 is an access network device corresponding to a cell in which the terminal device is currently located. If the access network device corresponding to the cell in which the terminal device is currently located is the anchor access network device, the first access network device and the anchor access network device are a same access network device. If the access network device corresponding to the cell, in which the terminal device is currently located, is not the anchor access network device, the first access network device and the anchor access network device are two different access network devices. However, the first access network device and the anchor access network device may be located in a same management area.

Figure 1B:
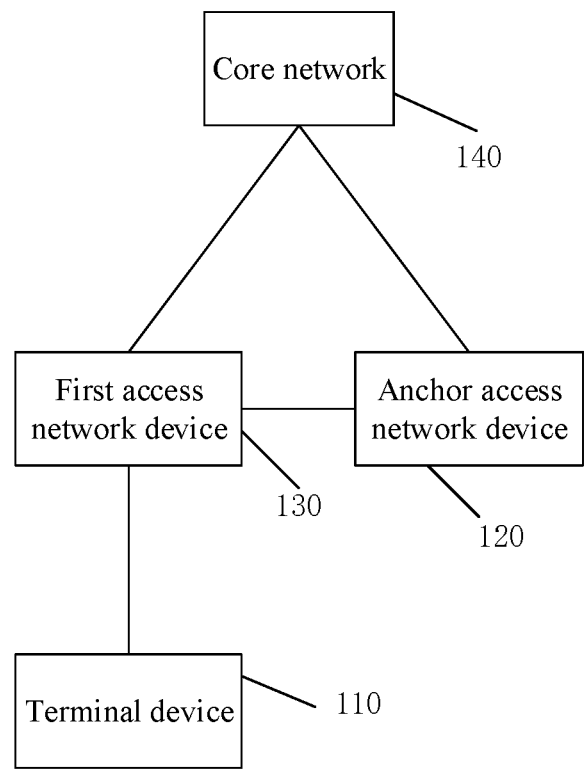
FIG. 1B is a schematic diagram of another network architecture.

Referring to FIG. 1B, the network architecture further includes a core network 140. When the terminal device 110 is in the third state, a connection of the terminal device is retained between the core network and the anchor access network device. When the terminal device is in an idle state, the connection of the terminal device that is retained between the core network and the anchor access network device is removed, and the anchor access network device does not keep the context information of the terminal device.

Figure 2:
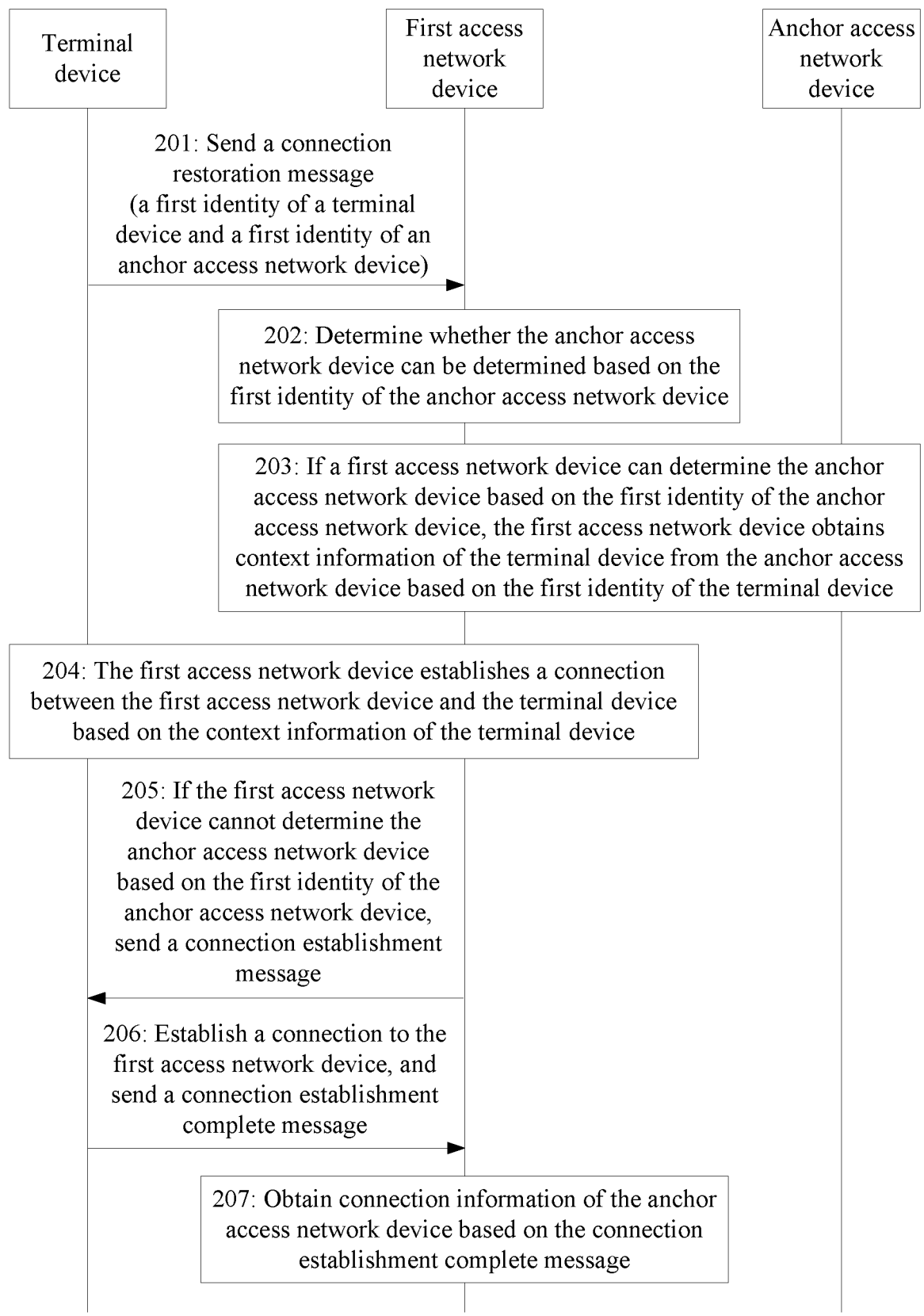
FIG. 2 is a flowchart of a communication method according to an embodiment of this application.

FIG. 2 shows a communication method according to an embodiment of this application. The method may be applied to the network architecture shown in FIG. 1A or FIG. 1B. The method includes the following steps.

Step 201: A terminal device sends a connection restoration message to a first access network device corresponding to a cell in which the terminal device is currently located, where the connection restoration message carries a first identity of the terminal device and a first identity of an anchor access network device.

The connection restoration message is generated by the terminal device. The connection restoration message may be a radio resource control (RRC) connection resume message, an RRC connection restoration message, an area update message, or the like.

In the following cases, the terminal device may send the connection restoration message to the first access network device corresponding to the cell in which the terminal device is currently located.

In a first case, the terminal device receives a paging message from the anchor access network device, and sends the connection restoration message to the first access network device, where the paging message carries the first identity of the terminal device and the first identity of the anchor access network device.

The first identity of the terminal device is used to identify the terminal device on the anchor access network device. The first identity of the anchor access network device is used to identify the anchor access network device in a first network. The first network is a part of a second network. The first network may be an operator network to which the anchor access network device belongs. The second network may be a global network.

In this embodiment, the terminal device is in a third state. Before the terminal device enters the third state, the terminal device is in a connected state. When the terminal device is in the connected state, an access network device corresponding to a cell in which the terminal device is located is the anchor access network device. When the terminal device enters the third state from the connected state, the anchor access network device configures a management area for the terminal device. The management area includes a cell of the anchor access network device that the terminal device accesses, and one or more other cells different from the cell.

The anchor access network device may send the paging message when a core network needs to send data to the terminal device. For example, the core network may send the data to the anchor access network device through a connection about the terminal device between the anchor access network device and the core network. The data includes the first identity of the terminal device. The anchor access network device receives the data, determines, based on the first identity of the terminal device, that the terminal device is in the third state, and sends the paging message to terminal devices in a cell of the anchor access network device and to other access network devices located in the management area. After receiving the paging message, the other access network devices send the paging message to terminal devices in each cell of the other access network devices.

When the cell in which the terminal device is currently located is the cell of the anchor access network device, the terminal device receives the paging message from the anchor access network device, and the first access network device and the anchor access network device are a same access network device. When the cell in which the terminal device is currently located is not the cell of the anchor access network device, the first access network device is different from the anchor access network device, and the terminal device receives a paging message from the first access network device.

In a second case, when the terminal device needs to send uplink data, the terminal device sends the connection restoration message to the first access network device.

In a third case, when the terminal device moves out of the management area configured by the anchor access network device, the terminal device sends the connection restoration message to the first access network device.

The connection restoration message may carry a complete first identity of the terminal device and/or a complete first identity of the anchor access network device. Alternatively, the connection restoration message may carry a part of information in the first identity of the terminal device and/or a part of information in the first identity of the anchor access network device.

Step 202: The first access network device receives the connection restoration message, and determines whether the anchor access network device can be determined based on the first identity of the anchor access network device.

There are two cases in which the first access network device determines the anchor access network device based on the first identity of the anchor access network device. In first case, the first access network device and the anchor access network device are a same access network device. In the second case, the first access network device and the anchor access network device are different access network devices, but the first access network device stores connection information of the anchor access network device, where the connection information is used to identify the anchor access network device in the second network.

The step 202 may be specifically carried out in the following way. The first access network device determines, based on the first identity of the anchor access network device, whether the first access network device is the anchor access network device. If the first access network device is the anchor access network device, the first access network device determines that the anchor access network device can be determined based on the first identity of the anchor access network device. If the first access network device is not the anchor access network device, the first access network device queries, based on the first identity of the anchor access network device, whether the first access network device has the connection information of the anchor access network device. If the first access network device has the connection information of the anchor access network device, the first access network device determines that the anchor access network device can be determined based on the first identity of the anchor access network device. If the first access network device does not have the connection information of the anchor access network device, the first access network device determines that the anchor access network device cannot be determined based on the first identity of the anchor access network device.

The first access network device stores a correspondence between a first identity and connection information. Therefore, the first access network device may query, from the correspondence between a first identity and connection information and based on the first identity of the anchor access network device, whether the connection information of the anchor access network device exists. If the connection information of the anchor access network device exists in the correspondence, it indicates that the first access network device has the connection information of the anchor access network device. If the connection information of the anchor access network device does not exist in the correspondence, it indicates that the first access network device does not have the connection information of the anchor access network device.

When the connection restoration message carries a part of information in the first identity of the anchor access network device, the first access network device may query the correspondence based on the part of information. If the first identity including the part of information is found, the first access network device obtains, from the correspondence, the connection information corresponding to the found first identity, and it indicates that the first access network device has the connection information of the anchor access network device. If the first identity including the part of information is not found, it indicates that the first access network device does not have the connection information of the anchor access network device.

There are two cases, in which the first access network device has the connection information of the anchor access network device. In a first case, the first access network device has obtained the connection information of the anchor access network device in advance, and has correspondingly stored the first identity of the anchor access network device and the connection information of the anchor access network device in the correspondence between a first identity and connection information. A second case includes the first case, and a difference from the first case lies in that the first access network device further establishes a connection to the anchor access network device based on the obtained connection information of the anchor access network device.

The connection information of the anchor access network device may include the first identity and a second identity of the anchor access network device, and the second identity of the anchor access network device is used to identify a first network in which the anchor access network device is located. Alternatively, the connection information of the anchor access network device may include a third identity of the anchor access network device, and the third identity of the anchor access network device is used to identify the anchor access network device in a second network.

The second identity of the anchor access network device may be a public land mobile network identity (PLMN ID) and/or routing information of the anchor access network device. The routing information of the anchor access network device may be a routing area code, a location area code, or the like of the anchor access network device. The third identity of the anchor access network device may be address information of the anchor access network device. The address information may be a transport layer address of the anchor access network device, for example, may be an Internet Protocol (IP) address.

Step 203: If the first access network device can determine the anchor access network device based on the first identity of the anchor access network device, the first access network device obtains context information of the terminal device from the anchor access network device based on the first identity of the terminal device.

This step may be as follows: When the first access network device is the anchor access network device, the first access network device directly obtains the context information of the terminal device locally based on the first identity of the terminal device.

When the first access network device is not the anchor access network device, the first access network device may obtain the context information of the terminal device in the following manner:

When a connection is established between the first access network device and the anchor access network device, the first access network device obtains the context information of the terminal device from the anchor access network device based on the first identity of the terminal device through the connection between the first access network device and the anchor access network device. When no connection is established between the first access network device and the anchor access network device, the first access network device establishes a connection between the first access network device and the anchor access network device based on the connection information of the anchor access network device. Then, the first access network device obtains the context information of the terminal device from the anchor access network device based on the first identity of the terminal device through the connection between the first access network device and the anchor access network device.

A process of establishing, by the first access network device, the connection between the first access network device and the anchor access network device may be as follows:

When the connection information of the anchor access network device includes the third identity of the anchor access network device, the first access network device may establish the connection to the anchor access network device based on the third identity of the anchor access network device.

Alternatively, when the connection information of the anchor access network device includes the first identity and the second identity of the anchor access network device, the first access network device may obtain the third identity of the anchor access network device based on the first identity and the second identity of the anchor access network device. Then, the first access network device may establish the connection between the first access network device and the anchor access network device based on the third identity of the anchor access network device.

An operation of obtaining, by the first access network device, the third identity of the anchor access network device may be carried out in the following way. The first access network device may send a query request message to the core network. The query request message carries the first identity and the second identity of the anchor access network device. The core network receives the query request message, and determines the anchor access network device based on the first identity and the second identity of the anchor access network device that are carried in the query request message. The core network obtains the third identity of the anchor access network device from the anchor access network device, and sends, to the first access network device, a query response message carrying the third identity of the anchor access network device. The first access network device receives the query response message, and obtains the third identity of the anchor access network device.

Step 204: The first access network device establishes a connection between the first access network device and the terminal device based on the context information of the terminal device, and the process ends.

The first access network device may further establish a connection about the terminal device between the first access network device and the core network based on the context information of the terminal device. In this way, the core network may send, to the first access network device, data that needs to be sent to the terminal device, and then the first access network device forwards the data to the terminal device.

Step 205: If the first access network device cannot determine the anchor access network device based on the first identity of the anchor access network device, the first access network device sends a connection establishment message to the terminal device.

The connection establishment message may be an RRC connection establishment message or the like. The connection establishment message is used to request the connection information of the anchor access network device.

The connection establishment message may carry first instruction information. The first instruction information is used to instruct the terminal device to send the second identity of the anchor access network device. Alternatively, the connection establishment message may carry second instruction information, where the second instruction information is used to instruct the terminal device to send the third identity of the anchor access network device.

Optionally, the connection establishment message may carry information about an established channel. The connection establishment message may further carry a connection parameter, and the connection parameter may be channel configuration information, resource allocation information, or the like.

Step 206: The terminal device receives the connection establishment message, establishes a connection to the first access network device, and sends a connection establishment complete message to the first access network device.

The connection establishment complete message is generated by the terminal device based on the information about the established channel that is carried in the connection establishment message. After receiving the connection establishment message, the terminal device clears previously stored context information, and re-establishes a connection based on the connection parameter carried in the connection establishment message.

The connection establishment complete message may be an RRC connection establishment complete message or the like. Sending, by the terminal device, the connection establishment complete message to the first access network device indicates that the terminal device has established the connection between the terminal device and the first access network device. The connection may be an RRC connection or the like.

When the connection establishment message carries the first instruction information, the terminal device obtains the second identity of the anchor access network device based on the first instruction information, and sends, to the first access network device, a connection establishment complete message carrying the second identity of the anchor access network device.

When the connection establishment message carries the second instruction information, the terminal device obtains the third identity of the anchor access network device based on the second instruction information, and sends, to the first access network device, a connection establishment complete message carrying the third identity of the anchor access network device.

The terminal device stores the third identity of the anchor access network device. The third identity of the anchor access network device is sent by the anchor access network device to the terminal device when the terminal device enters the third state or when the terminal device accesses the anchor access network device.

Optionally, if the connection restoration message sent by the terminal device carries the part of information in the first identity of the anchor access network device, the connection establishment complete message sent by the terminal device further carries a remaining part of information in the first identity of the anchor access network device.

Step 207: The first access network device receives the connection establishment complete message from the terminal device, and obtains connection information of the anchor access network device based on the connection establishment complete message.

The connection information of the anchor access network device may include the first identity and the second identity of the anchor access network device, or the connection information of the anchor access network device may include the third identity of the anchor access network device.

The first access network device may obtain the connection information of the anchor access network device in the following manners.

In a first manner, when the connection establishment complete message carries the second identity of the anchor access network device, the first access network device extracts the second identity of the anchor access network device from the connection establishment complete message. The first access network device also extracts the first identity of the anchor access network device that is carried in the connection restoration message, to obtain the connection information of the anchor access network device. Alternatively, the first access network device continues to obtain the third identity of the anchor access network device based on the extracted first identity and second identity of the anchor access network device, to obtain the connection information of the anchor access network device.

For a detailed process of obtaining, by the first access network device, the third identity of the anchor access network device based on the first identity and the second identity, refer to related content in step 203. Details are not described herein again.

The connection restoration message may carry the part of information in the first identity of the anchor access network device, and the connection establishment complete message may carry the remaining part of information in the first identity of the anchor access network device. In this case, the first access network device may combine the part of information in the first identity of the anchor access network device and the remaining part of information in the first identity, to form a complete first identity. Then the first access network device combines the first identity and the second identity of the anchor access network device to form the connection information of the anchor access network device, or obtains the third identity of the anchor access network device based on the first identity and the second identity of the anchor access network device.

In a second manner, when the connection establishment complete message carries the third identity of the anchor access network device, the first access network device extracts the third identity of the anchor access network device that is carried in the connection establishment complete message, to obtain the connection information of the anchor access network device.

After obtaining the connection information of the anchor access network device, the first access network device may correspondingly store the first identity of the anchor access network device and the connection information of the anchor access network device in the correspondence between a first identity and connection information.

After obtaining the connection information of the anchor access network device, the first access network device may establish the connection between the first access network device and the anchor access network device based on the connection information of the anchor access network device. Alternatively, the first access network device does not establish the connection between the first access network device and the anchor access network device. When receiving a connection restoration message from another terminal device that belongs to the same anchor access network device as the terminal device, the first access network device establishes the connection between the first access network device and the anchor access network device based on the connection information of the anchor access network device. After the connection is established, the first access network device obtains context information of the another terminal device from the anchor access network device. For an implementation process of establishing the connection, refer to related content in step 203. For obtaining the context information of the another terminal device, refer to related content in steps 202 and 203. Details are not described herein again.

After receiving the connection establishment complete message from the terminal device, the first access network device further establishes the connection about the terminal device between the first access network device and the core network. Then the core network may first send, to the first access network device, data that needs to be sent to the terminal device, and then the first access network device forwards the data to the terminal device.

In this embodiment, for a current terminal device, the first access network device cannot obtain context information of the terminal device from the anchor access network device, but re-establishes a connection to the current terminal device. However, the first access network device obtains the connection information of the anchor access network device in a connection re-establishment process. Next time when another terminal device that belongs to the same anchor access network device as the terminal device sends a connection restoration message, the first access network device obtains context information of the another terminal device from the anchor access network device based on the connection information of the anchor access network device. The first access network device establishes a connection between the first access network device and the another terminal device based on the context information of the another terminal device. This avoids wasting the context information of the another terminal device that is stored on the anchor access network device, and adapts to a communication requirement of a terminal in a third state.

Figure 3A:
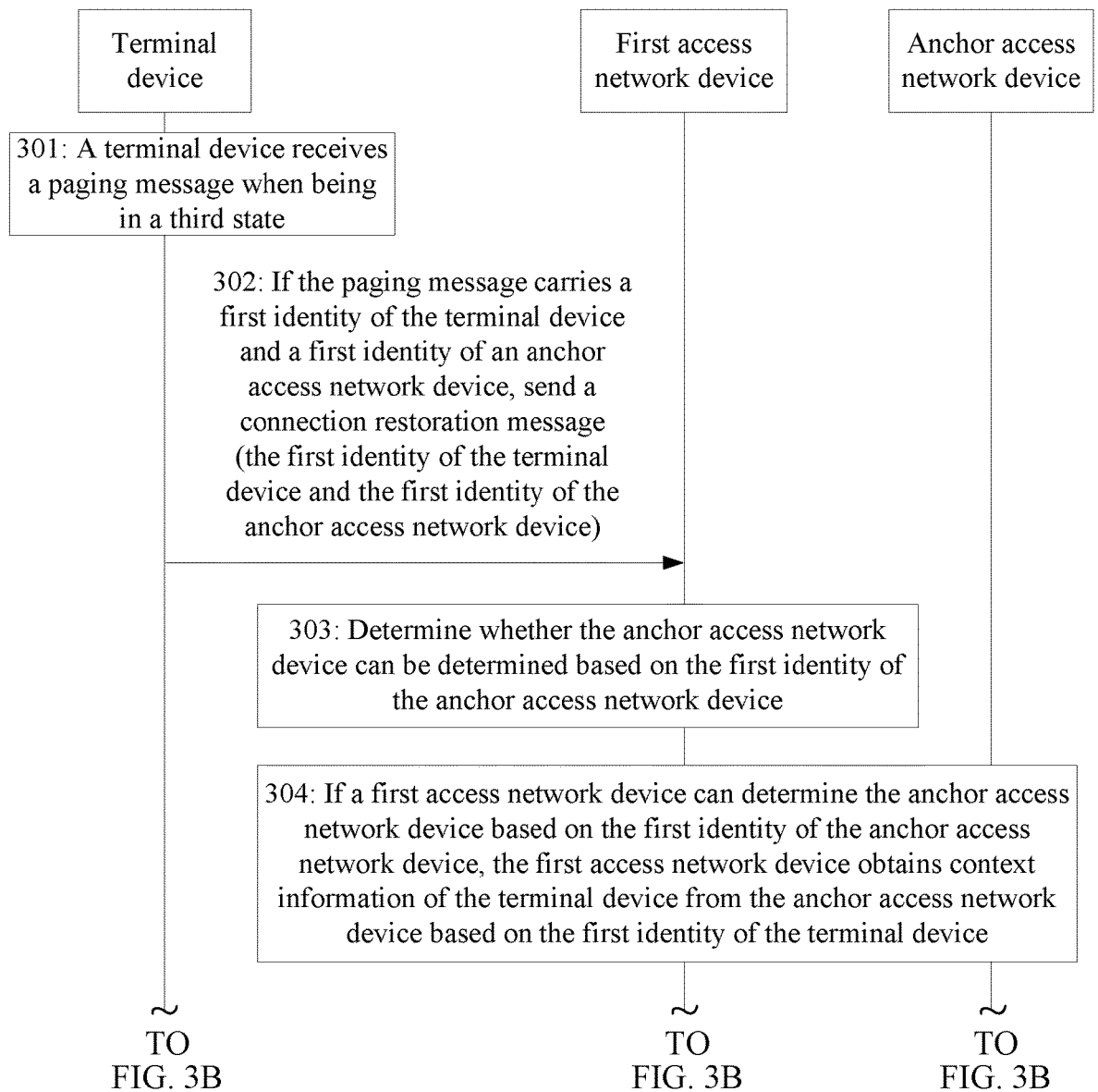
FIG. 3A and FIG. 3B are a flowchart of a communication method according to another embodiment of this application.
Figure 3B:
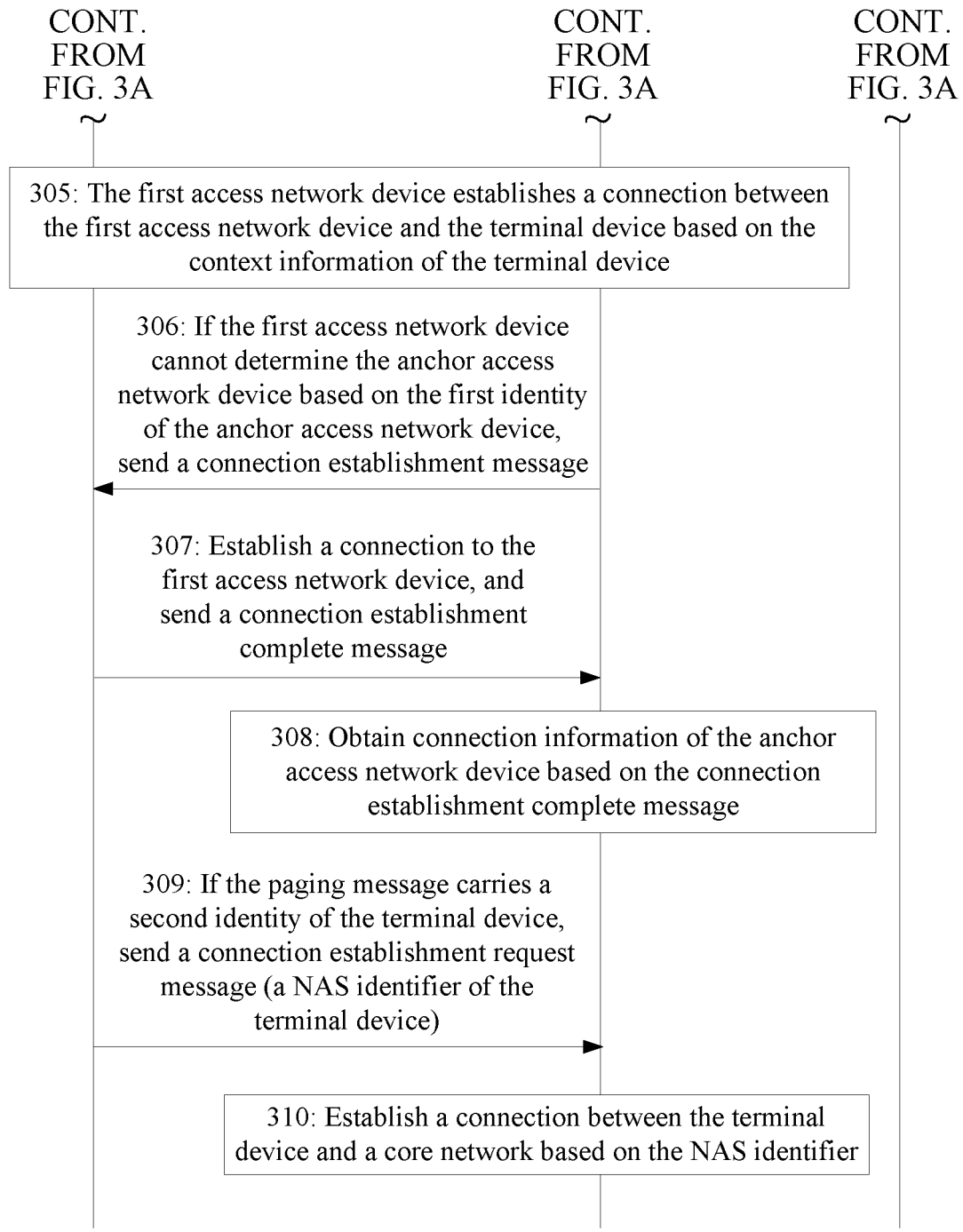

FIG. 3A and FIG. 3B show a communication method according to another embodiment of this application. The method may be applied to the network architecture shown in FIG. 1A or FIG. 1B. The method is applied to a case in which a status of a terminal device that is stored on the terminal device is inconsistent with a status of the terminal device that is stored in a core network. The method includes the following steps.

Step 301: A terminal device receives a paging message when the terminal device is in a third state.

When the terminal device is in the third state, a connection about the terminal device between an anchor access network device and a core network may be removed because signal strength of an environment, in which the terminal device is located, is relatively poor. For example, when the anchor access network device pages the terminal device, the terminal device fails to receive the paging because the signal strength of the environment is relatively poor. The anchor access network device cannot receive a paging response from the terminal device, and therefore deletes context information of the terminal device, and releases the connection about the terminal device between the anchor access network device and the core network. In addition, the core network changes a status of the terminal device from the third state to an idle state. However, a status stored on the terminal device is still the third state. Consequently, the status of the terminal device that is stored on the terminal device is inconsistent with the status of the terminal device that is stored in the core network.

When the status of the terminal device that is stored in the core network is still the third state, and the core network needs to send data to the terminal device, the core network first sends, to the anchor access network device, data including a first identity of the terminal device. The anchor access network device receives the data, sends a first paging message to a cell of the anchor access network device, and sends a second paging message to another access network device in a management area. The first paging message and the second paging message carry the first identity of the terminal device and a first identity of the anchor access network device. The first identity of the terminal device and the first identity of the anchor access network device are allocated by the anchor access network device to the terminal device, and are used by the terminal device to restore a connection when the terminal device is in the third state. The first identity of the terminal device is used to identify the terminal device on the anchor access network device. The first identity of the anchor access network device is used to identify the anchor access network device in an access network. After receiving the second paging message, another access network device sends, in a cell of the another access network device, a third paging message to the terminal device based on the second paging message. Correspondingly, the terminal device receives the first paging message sent by the anchor access network device or the third paging message sent by the another access network device in the management area.

When the status of the terminal device that is stored in the core network is the idle state, and the core network needs to send data to the terminal device, the core network first sends a paging message to an access network device in a tracking area in which the terminal device is located. The paging message carries a second identity of the terminal device. The second identity of the terminal device is used to identify the terminal device in the core network. For example, the second identity is an international mobile subscriber identity (IMSI) or a packet temporary mobile subscriber identity (P-TMSI). After receiving the paging message, the access network device in the tracking area sends, to a cell of the access network device based on the paging message, an access network paging message carrying the second identity of the terminal device. Correspondingly, the terminal device receives the access network paging message from the access network device in the tracking area.

Step 302: If the paging message carries a first identity of the terminal device and a first identity of an anchor access network device, the terminal device generates a connection restoration message, and sends the connection restoration message to a first access network device corresponding to a cell in which the terminal device is currently located. The connection restoration message carries the first identity of the terminal device and the first identity of the anchor access network device.

For a detailed process of sending the connection restoration message by the terminal device, refer to related content in step 201. Details are not described herein again.

Steps 303 to 308 are respectively the same as steps 202 to 207. Details are not described herein again.

Step 309: If the paging message carries a second identity of the terminal device, the terminal device sends a connection establishment request message to the first access network device corresponding to the cell in which the terminal device is currently located, where the connection establishment request message carries a non-access stratum (NAS) identifier of the terminal device.

Optionally, after receiving the paging message carrying the second identity of the terminal device, and before sending the connection establishment request message to the first access network device corresponding to the cell in which the terminal device is currently located, the terminal device clears stored context information, and enters the idle state.

For example, the NAS identifier may be an IMSI, a temporary mobile subscriber identity (T-MSI), or a P-TMSI.

The NAS identifier is used to identify the terminal device in the core network. The connection establishment request message may be an RRC connection establishment request message.

Step 310: The first access network device receives the connection establishment request message, and establishes a connection between the terminal device and a core network based on the NAS identifier carried in the connection establishment request message.

In this embodiment, when the terminal device is in the third state, the terminal device determines content carried in the paging message. If the paging message carries the first identity of the terminal device and the first identity of the anchor access network device, the terminal device sends, to the first access network device, the connection restoration message carrying the first identity of the anchor access network device. The connection restoration message requests the first access network device to establish the connection between the terminal device and the core network. If the paging message carries the second identity of the terminal device, the terminal device sends, to the first access network device, the connection establishment request message carrying the NAS identifier of the terminal device, to request the first access network device to establish the connection between the terminal device and the core network. The terminal device determines, based on the content carried in the paging message, whether paging is initiated by the core network or an access network device, and further initiates different paging response processes based on different paging devices. This can ensure that the connection between the terminal device and the core network can be successfully restored as quickly as possible.

Figure 4:
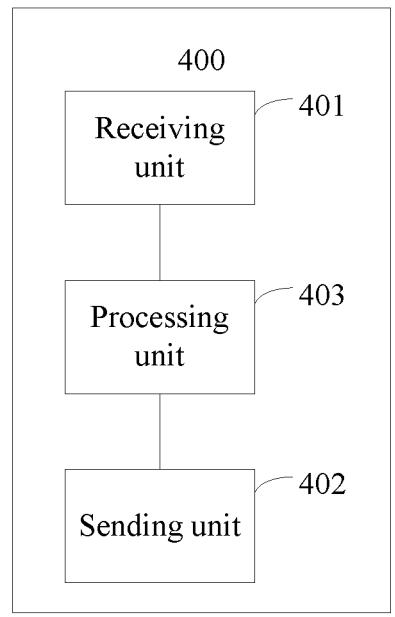
FIG. 4 is a block diagram of a communications apparatus according to an embodiment of this application.

FIG. 4 shows a communications apparatus 400 according to an embodiment of this application. The apparatus 400 includes a receiving unit 401, a sending unit 402, and a processing unit 403.

The receiving unit 401 is configured to receive a connection restoration message from a terminal device. The connection restoration message carries a first identity of an anchor access network device. The anchor access network device stores context information of the terminal device. The first identity of the anchor access network device is used to identify the anchor access network device in a first network, and the first network is a part of a second network.

The sending unit 402 is configured to send a connection establishment message to the terminal device based on the first identity of the anchor access network device, where the connection establishment message is used to request connection information of the anchor access network device.

The processing unit 403 is configured to obtain the connection information of the anchor access network device, where the connection information is used to identify the anchor access network device in the second network.

Optionally, the connection restoration message is generated by the terminal device. The connection restoration message may be an RRC connection resume message, an RRC connection restoration message, an area update message, or the like.

The terminal device may send the connection restoration message to the apparatus 400 in three cases. For specific content of the three cases, refer to related content in step 201. Details are not described herein again.

In a possible implementation, the connection information includes the first identity and a second identity of the anchor access network device. The second identity is used to identify the first network in which the anchor access network device is located. The connection establishment message carries first instruction information, and the first instruction information is used to instruct the terminal device to send the second identity of the anchor access network device.

The processing unit 403 is configured to: receive, by using the receiving unit 401, a connection establishment complete message from the terminal device, where the connection establishment complete message carries the second identity of the anchor access network device; and obtain the first identity of the anchor access network device that is carried in the connection restoration message.

In a possible implementation, the connection information includes a third identity of the anchor access network device. The third identity is used to identify the anchor access network device in the second network. The connection establishment message carries first instruction information, and the first instruction information is used to instruct the terminal device to send a second identity of the anchor access network device.

The processing unit 403 is configured to: receive, by using the receiving unit 401, a connection establishment complete message from the terminal device, where the connection establishment complete message carries the second identity of the anchor access network device; and obtain the third identity of the anchor access network device based on the first identity and the second identity.

Optionally, the second identity of the anchor access network device may be a PLMN ID and/or routing information of the anchor access network device. The routing information of the anchor access network device may be a routing area code, a location area code, or the like of the anchor access network device. The third identity of the anchor access network device may be address information of the anchor access network device. The address information may be a transport layer address of the anchor access network device.

For obtaining, by the processing unit 403, the third identity of the anchor access network device based on the first identity and the second identity, refer to content of obtaining, by the apparatus, the third identity of the anchor access network device based on the first identity and the second identity in step 203. Details are not described herein again.

Optionally, in a possible implementation, the connection restoration message carries a part of information in the first identity of the anchor access network device, and the connection establishment complete message further carries a remaining part of information in the first identity of the anchor access network device.

The processing unit 403 is further configured to combine the part of information in the first identity of the anchor access network device and the remaining part of information in the first identity of the anchor access network device to form the first identity of the anchor access network device.

In a possible implementation, the connection information includes a third identity of the anchor access network device. The third identity is used to identify the anchor access network device in the second network. The connection establishment message carries second instruction information, and the second instruction information is used to instruct the terminal device to send the third identity of the anchor access network device.

The processing unit 403 is configured to receive, by using the receiving unit 401, a connection establishment complete message from the terminal device, where the connection establishment complete message carries the third identity of the anchor access network device.

The terminal device stores the third identity of the anchor access network device. The third identity is sent from the anchor access network device to the terminal device when the terminal device is in a connected state or starts to enter a third state.

In a possible implementation, the processing unit 403 is further configured to determine whether the anchor access network device can be determined based on the first identity of the anchor access network device. If the processing unit 403 determines that the anchor access network device cannot be determined based on the first identity of the anchor access network device, the sending unit 402 performs the operation of sending a connection establishment message to the terminal device.

For a detailed determining process of the processing unit 403, refer to content related to determining, by the apparatus, whether the anchor access network device can be determined based on the first identity of the anchor access network device in step 202. Details are not described herein again.

In a possible implementation, the processing unit 403 is configured to: when the apparatus determines, based on the first identity of the anchor access network device, that the apparatus is not the anchor access network device and the apparatus does not have the connection information of the anchor access network device, determine that the anchor access network device cannot be determined based on the first identity of the anchor access network device.

In this embodiment, for a current terminal device, the processing unit determines that context information of the terminal device cannot be obtained from the anchor access network device, but re-establishes a connection for the current terminal device. However, the processing unit obtains the connection information of the anchor access network device in a connection re-establishment process. Next time, when another terminal device, that belongs to the same anchor access network device as the terminal device, sends a connection restoration message, the processing unit obtains context information of the another terminal device from the anchor access network device based on the connection information of the anchor access network device, and establishes a connection between the apparatus and the another terminal device based on the context information of the another terminal device. This avoids wasting the context information of the another terminal device that is stored on the anchor access network device.

Figure 5:
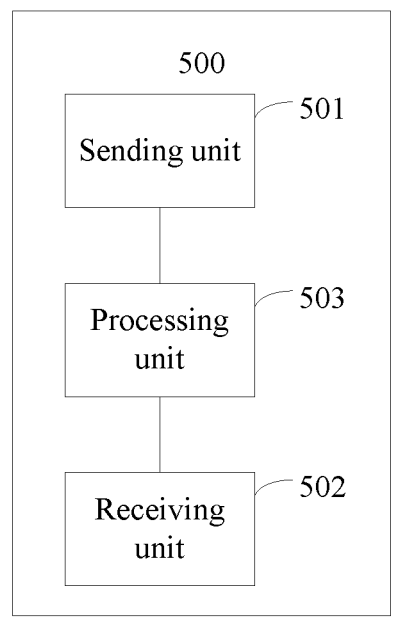
FIG. 5 is a block diagram of a communications apparatus according to another embodiment of this application.

FIG. 5 shows a communications apparatus 500 according to an embodiment of this application. The apparatus 500 includes a sending unit 501 and a receiving unit 502.

The sending unit 501 is configured to send a connection restoration message to a first access network device, where the connection restoration message carries a first identity of an anchor access network device, the first identity of the anchor access network device is used to identify the anchor access network device in a first network, and the first network is a part of a second network.

The receiving unit 502 is configured to receive a connection establishment message in response to the connection restoration message.

The sending unit 501 is further configured to send a connection establishment complete message to the first access network device, where the connection establishment complete message is used to obtain connection information of the anchor access network device, and the connection information is used to identify the anchor access network device in the second network.

Optionally, the apparatus 500 further includes a processing unit 503, where the connection restoration message is generated by the processing unit 503. The connection restoration message may be an RRC connection resume message, an RRC connection restoration message, an area update message, or the like.

The sending unit 501 may send the connection restoration message to the first access network device in three cases. For specific content of the three cases, refer to related content in step 201. Details are not described herein again.

In a possible implementation, the processing unit 503 is configured to generate the connection restoration message and/or generate the connection establishment complete message.

In a possible implementation, the connection establishment message carries first instruction information, the first instruction information is used to instruct the apparatus 500 to send a second identity of the anchor access network device, and the second identity is used to identify the first network in which the anchor access network device is located.

The sending unit 501 is configured to send the connection establishment complete message to the first access network device based on the first instruction information, where the connection establishment complete message carries the second identity of the anchor access network device.

In a possible implementation, the connection restoration message carries a part of information in the first identity of the anchor access network device, and the connection establishment complete message further carries a remaining part of information in the first identity of the anchor access network device.

In a possible implementation, the connection establishment message carries second instruction information, and the second instruction information is used to instruct the apparatus 500 to send a third identity of the anchor access network device.

The sending unit 501 is configured to send the connection establishment complete message to the first access network device based on the second instruction information, where the connection establishment complete message carries the third identity of the anchor access network device.

Optionally, the second identity of the anchor access network device may be a PLMN ID and/or routing information of the anchor access network device. The routing information of the anchor access network device may be a routing area code, a location area code, or the like of the anchor access network device. The third identity of the anchor access network device may be address information of the anchor access network device. The address information may be a transport layer address of the anchor access network device.

The third identity of the anchor access network device that is sent by the sending unit 501 is prestored on the apparatus 500. When the apparatus 500 is in a connected state or enters a third state, the apparatus 500 receives, by using the receiving unit 502, the third identity from the anchor access network device, and stores the third identity locally by using the processing unit 503.

Figure 6:
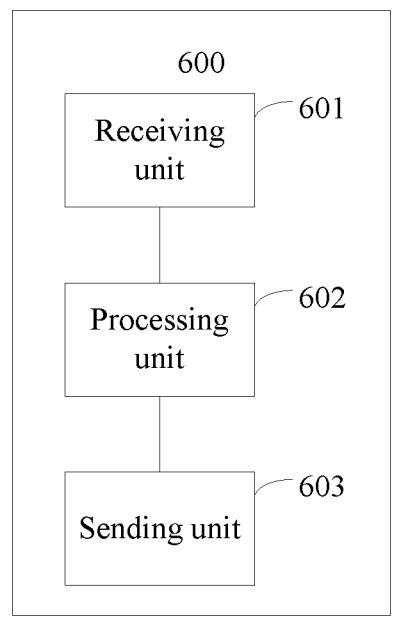
FIG. 6 is a block diagram of a communications apparatus according to yet another embodiment of this application.

FIG. 6 shows a communications apparatus 600 according to an embodiment of this application. The apparatus 600 includes a receiving unit 601, a processing unit 602 and a sending unit 603.

The receiving unit 601 is configured to receive a paging message, where the apparatus 600 is in a third state.

The processing unit 602 is configured to determine content carried in the paging message.

The sending unit 603 is configured to: when the carried content is a first identity of the apparatus 600 and a first identity of an anchor access network device, send a connection restoration message to a first access network device corresponding to a cell in which the apparatus 600 is currently located, where the connection restoration message carries the first identity of the apparatus 600 and the first identity of the anchor access network device, the connection restoration message is used by the first access network device to establish a connection to the apparatus 600, the first identity of the apparatus 600 is used to identify the apparatus 600 on the anchor access network device, and the first identity of the anchor access network device is used to identify the anchor access network device in an access network.

The sending unit 603 is further configured to: when the carried content is a second identity of the apparatus, send a connection establishment request message to the first access network device, where the connection establishment request message carries a non-access stratum (NAS) identifier of the apparatus 600, the connection establishment request message is used by the first access network device to establish a connection to the apparatus 600, and the second identity of the apparatus 600 is used to identify the apparatus 600 in a core network.

In this embodiment, when the apparatus is in the third state, the apparatus determines the content carried in the paging message. If the paging message carries the first identity of the apparatus and the first identity of the anchor access network device, the apparatus sends the connection restoration message to the first access network device. If the paging message carries the second identity of the apparatus, the apparatus sends, to the first access network device, the connection establishment request message carrying the NAS identifier of the apparatus. The apparatus determines, based on the content carried in the paging message, whether paging is initiated by the core network or an access network device, and further initiates different paging response processes based on different paging devices. This can ensure that a connection between the apparatus and the core network can be successfully restored as quickly as possible.

Figure 7:
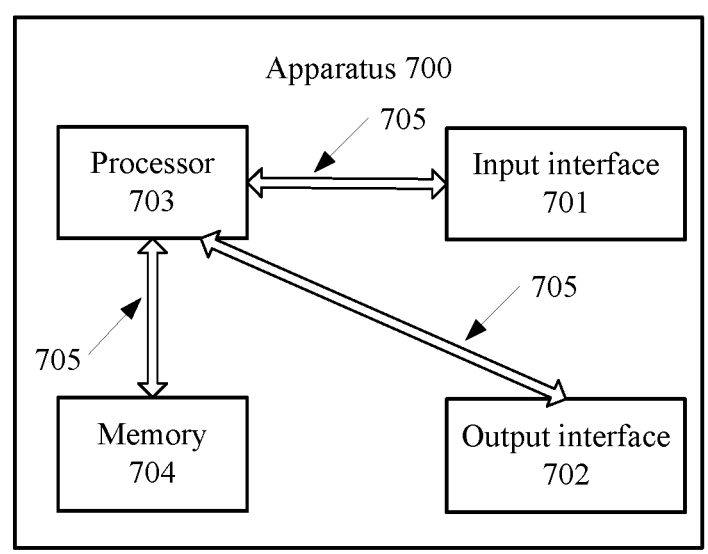
FIG. 7 is a block diagram of a communications apparatus according to still another embodiment of this application.

FIG. 7 is another schematic diagram of a communications apparatus 700 according to an embodiment of this application. As shown in FIG. 7, the apparatus 700 may be the first access network device in the foregoing embodiments, and includes: an input interface 701, an output interface 702, a processor 703, and a memory 704. The input interface 701, the output interface 702, the processor 703, and the memory 704 may be connected to each other by using a bus system 705. Optionally, the input interface and the output interface may be omitted.

The memory 704 is configured to store a program, an instruction, or code. The processor 703 is configured to execute the program, the instruction, or the code in the memory 704. By executing the program, the instruction, or the code, the processor controls the input interface 701 to receive a signal, controls the output interface 702 to send a signal, and implements the steps and the functions that are implemented by the first access network device in the implementations corresponding to FIG. 2 and FIG. 3A and FIG. 3B. For specific implementations of the input interface 701, the output interface 702, and the processor 703, correspondingly refer to specific descriptions of the receiving unit 401, the sending unit 402, and the processing unit 403 in the implementation corresponding to FIG. 4. Details are not described herein again.

It should be understood that, in this embodiment of this application, the processor 703 may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 704 may include a read-only memory and a random access memory, and provide an instruction and data for the processor 703. A part of the memory 704 may further include a non-volatile random access memory. For example, the memory 704 may further store information about a device type.

The bus system 705 may further include a power bus, a control bus, a status signal bus, and the like in addition to a data bus. However, for clarity of description, various types of buses in the figure are marked as the bus system.

In an implementation process, the steps of the method/methods shown in FIG. 2 and/or FIG. 3A and FIG. 3B may be performed by using an integrated logic circuit of hardware in the processor 703 or an instruction in a form of software. The steps of the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory 704. The processor 703 reads information from the memory 704, and performs the steps of the method/methods shown in FIG. 2 and/or FIG. 3A and FIG. 3B in combination with the hardware of the processor 703. To avoid repetition, details are not described herein again.

It should be noted that, in a specific implementation, the processing unit in FIG. 4 may be implemented by, for example, the processor 703 in FIG. 7, the sending unit may be implemented by a transmitter, and the receiving unit may be implemented by a receiver.

Figure 8:
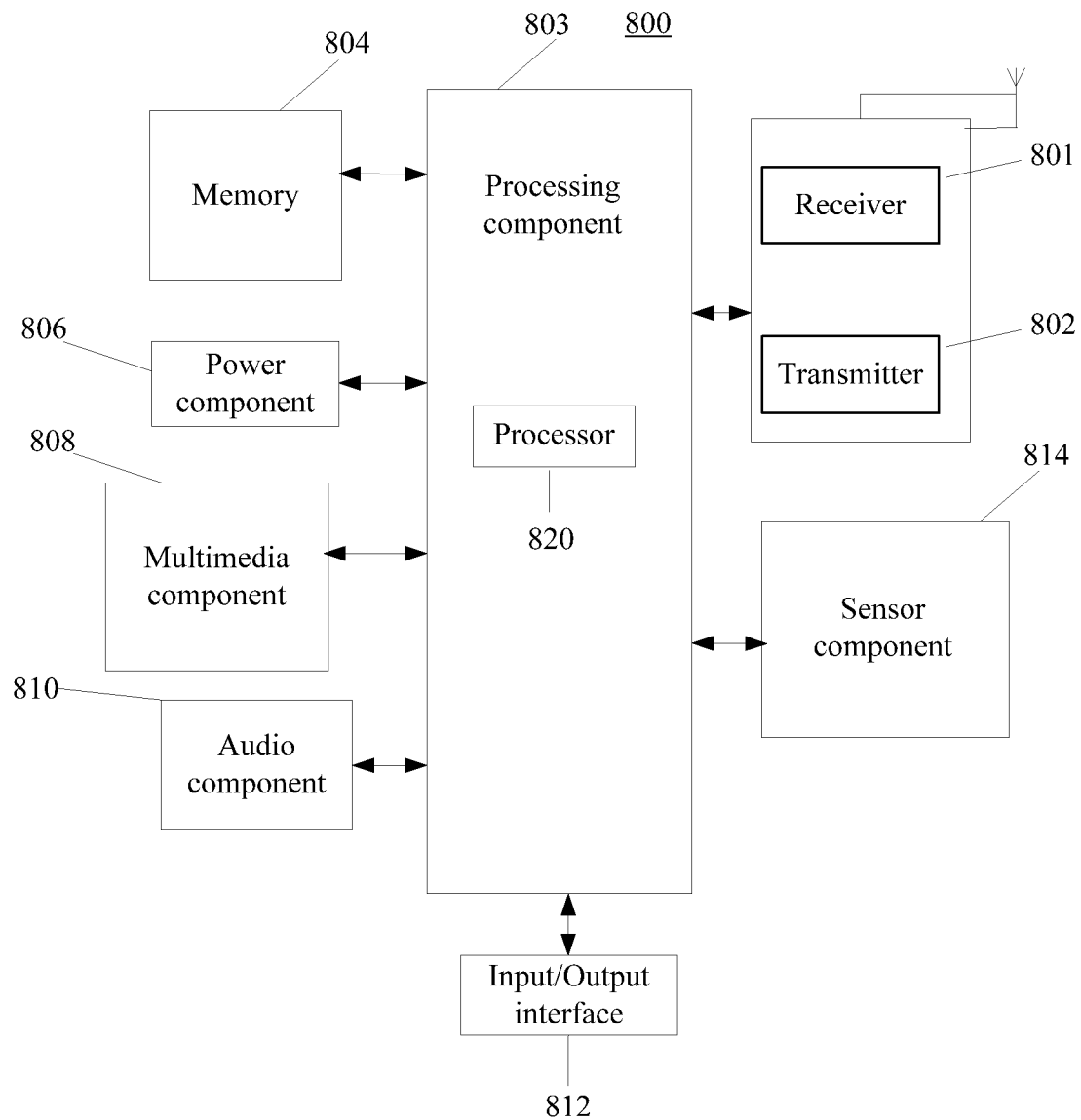
FIG. 8 is a structural diagram of a communications apparatus according to an embodiment of this application.

FIG. 8 is a block diagram of a communications apparatus 800 according to an example embodiment. The apparatus 800 may be the terminal device in the foregoing embodiments. For example, the apparatus 800 may be a mobile phone, a computer, or a tablet device.

Referring to FIG. 8, the apparatus 800 may include one or more of the following components: a receiver 801, a transmitter 802, a processing component 803, a memory 804, a power component 806, a multimedia component 808, an audio component 810, an input/output (I/O) interface 812, and a sensor component 814. The foregoing plurality of components may be connected to each other by using a system bus.

The processing component 803 usually controls overall operations of the apparatus 800, for example, operations related to display, a phone call, data communication, a camera operation, and a record operation. The processing component 803 may include one or more processors 820 to execute an instruction, to perform all or some of the steps of the foregoing methods. In addition, the processing component 803 may include one or more modules, to facilitate interaction between the processing component 803 and another component. For example, the processing component 803 may include a multimedia module, to facilitate interaction between the multimedia component 808 and the processing component 803.

The memory 804 is configured to store various types of data, to support operations on the apparatus 800. An example of the data includes an instruction, contact data, address book data, a message, a picture, a video, or the like, used to perform an operation on the apparatus 800, of any application program or method. The memory 804 may be implemented by any type of volatile storage device, any type of non-volatile storage device, or a combination thereof, for example, a static random access memory (SRAM), an electrically erasable programmable read-only memory (EEPROM), an erasable programmable read-only memory (EPROM), a programmable read-only memory (PROM), read-only memory (ROM), a magnetic memory, a flash memory, a magnetic disk, or an optical disc.

The power component 806 provides electric power for various components of the apparatus 800. The power component 806 may include a power management system, one or more power supplies, and other components related to electric power generation, management and allocation of the apparatus 800.

The multimedia component 808 includes a screen that is between the apparatus 800 and a user and that provides an output interface. In some embodiments, the screen may include a liquid crystal display (LCD) and a touch panel (TP). If the screen includes the touch panel, the screen may be implemented as a touchscreen, to receive an input signal from the user. The touch panel includes one or more touch sensors, to sense touching, sliding, and a gesture on the touch panel. The touch sensor may not only sense a boundary of a touching or sliding action, but also detect duration and pressure that are related to the touching or sliding operation. In some embodiments, the multimedia component 808 includes a front-facing camera and/or a rear-facing camera. When the apparatus 800 is in an operating mode, such as a shooting mode or a video mode, the front-facing camera and/or the rear-facing camera may receive external multimedia data. Each front-facing camera or each rear-facing camera may be a fixed optical lens system or have focusing and optical zooming capabilities.

The audio component 810 is configured to output and/or input an audio signal. For example, the audio component 810 includes a microphone (MIC). When the apparatus 800 is in an operating mode, such as a call mode, a record mode, or a speech recognition mode, the microphone is configured to receive an external audio signal. The received audio signal may be further stored in the memory 804, or sent by using a communications component 816. In some embodiments, the audio component 810 further includes a speaker, configured to output an audio signal.

The I/O interface 812 provides an interface between the processing component 803 and a peripheral interface module. The peripheral interface module may be a keyboard, a click wheel, a button, or the like. Buttons may include but are not limited to a home page button, a volume bottom, a start button, and a lock button.

The sensor component 814 includes one or more sensors, configured to provide status evaluation for the apparatus 800 in various aspects. For example, the sensor component 814 may detect an on/off state of the apparatus 800 and relative positioning of components. For example, the components are a display and a keypad of the apparatus 800. The sensor component 814 may further detect a location change of the apparatus 800 or a component of the apparatus 800, whether a user is in contact with the apparatus 800 or not, an orientation and/or acceleration/deceleration of the apparatus 800, and a temperature change of the apparatus 800. The sensor component 814 may include a proximity sensor, configured to detect existence of a nearby object when there is no physical contact. The sensor component 814 may further include an optical sensor, such as a CMOS or CCD image sensor, used in an imaging application. In some embodiments, the sensor component 814 may further include an acceleration sensor, a gyro sensor, a magnetic sensor, a pressure sensor, or a temperature sensor.

The receiver 801 and the transmitter 802 are configured to facilitate wired or wireless communication between the apparatus 800 and another device. The apparatus 800 may access a communications standard—wireless network, for example, Wi-Fi, 2G, 3G, or a combination thereof.

In an example embodiment, the apparatus 800 may be implemented by one or more application-specific integrated circuits (ASIC), a digital signal processor (DSP), a digital signal processing device (DSPD), a programmable logic device (PLD), a field programmable gate array (FPGA), a controller, a microcontroller, a microprocessor, or another electronic element, to perform the foregoing methods.

It should be noted that, in a specific implementation, the processing unit in FIG. 5 or the processing unit in FIG. 6 may be implemented by the processor 820 in FIG. 8. The sending unit in FIG. 5 or the sending unit in FIG. 6 may be implemented by the transmitter 802 in FIG. 8. The receiving unit in FIG. 5 or the receiving unit in FIG. 6 may be implemented by the receiver 801 in FIG. 8.

All or some of the steps in the embodiments may be implemented by hardware or a program instructing related hardware. The program may be stored in a computer readable storage medium. The storage medium may include a read-only memory, a magnetic disk, an optical disc, or the like.

The foregoing descriptions are merely examples of this application, but are not intended to limit this application. Any modification, equivalent replacement, or improvement made within the spirit and principle of this application shall fall within the protection scope of this application.

What is claimed is:

1. A method for a terminal device in an inactive state, comprising:
   receiving a paging message, a content carried in the paging message comprising:
      a first identity of the terminal device and an identity of an anchor access network device, or
      a second identity of the terminal device; and
      in response to the content carried in the paging message comprising the first identity of the terminal device and the identity of the anchor access network device, sending a first request message to a first access network device; or in response to the content carried in the paging message comprises the second identity of the terminal device, sending a second request message to the first access network device, and clearing stored context information,
   wherein the first request message is a connection resume request message carrying information of the first identity of the terminal device and information of the identity of the anchor access network device, wherein the first identity of the terminal device identifies the terminal device on the anchor access network device, and wherein the identity of the anchor access network device identifies the anchor access network device in an access network, and
   wherein the second request message is a connection establishment request message carries a third identity of the terminal device, wherein the second identity of the terminal device identifies the terminal device in a core network, and wherein the third identity of the terminal device identifies the terminal device in the core network.

2. The method according to claim 1, further comprising: establishing, based on the second request message, a connection to the first access network device.

3. The method according to claim 1, further comprising:

resuming, based on the first request message, a connection to the first access network device.

4. The method according to claim 1, wherein if the second request message is sent, the method further comprising:
receiving a connection establishment message from the first access network device indicating that the first access network device is unable to determine the anchor access network device based on the information of the identity of the anchor access network device carried in the second request message;
establishing a connection to the first access network device; and
sending, a connection establishment complete message to the first access network device, wherein the connection establishment complete message carries connection information of the anchor access network device.

5. The method according to claim 1, wherein the first access network device is corresponding to a cell in which the terminal device is located.

6. The method according to claim 1, wherein the third identity of the terminal device is a non-access stratum (NAS) identifier of the terminal device.

7. The method according to claim 1, further comprising:
in response to the content carried in the paging message comprising the second identity of the terminal device, entering an idle state.

8. An apparatus for a terminal device in an inactive state, comprising:
at least one processor; and
one or more memories coupled to the at least one processor and storing program instructions for execution by the at least one processor to cause the terminal device to perform operations, the operations including:
receiving a paging message, a content carried in the paging message comprising:
a first identity of the terminal device and an identity of an anchor access network device, or
a second identity of the terminal device; and
in response to the content carried in the paging message comprising the first identity of the terminal device and the identity of the anchor access network device, sending a first request message to a first access network device; or in response to the content carried in the paging message comprises the second identity of the terminal device, sending a second request message to the first access network device, and clearing stored context information,
wherein the first request message is a connection resume request message carrying information of the first identity of the terminal device and information of the identity of the anchor access network device, wherein the first identity of the terminal device identifies the terminal device on the anchor access network device, and wherein the identity of the anchor access network device identifies the anchor access network device in an access network, and
wherein the second request message is a connection establishment request message carries information of a third identity of the terminal device wherein the second identity of the terminal device identifies the terminal device in a core network, and wherein the third identity of the terminal device identifies the terminal device in the core network.

9. The apparatus according to claim 8, the operations further comprising:
establishing a connection between the terminal device and the first access network device based on the second request message.

10. The apparatus according to claim 8, the operations further comprising:
resuming a connection between the terminal device and the first access network device based on the first request message.

11. The apparatus according to claim 8, wherein if the second request message is sent, the operations further comprising:
receiving a connection establishment message from the first access network device indicating that the first access network device is unable to determine the anchor access network device based on the information of the identity of the anchor access network device carried in the second request message;
establishing a connection between the terminal device and the first access network device; and
sending a connection establishment complete message to the first access network device, wherein the connection establishment complete message carries connection information of the anchor access network device.

12. The apparatus according to claim 8, wherein the first access network device is corresponding to a cell in which the terminal device is located.

13. The apparatus according to claim 8, wherein the third identity of the terminal device is a non-access stratum (NAS) identifier of the terminal device.

14. The apparatus according to claim 8, the operations further comprising:
in response to the content carried in the paging message comprising the second identity of the terminal device, entering an idle state.

15. A non-transitory computer readable storage medium storing instructions that, when the instructions are executed by a terminal device in an inactive state, cause the terminal device to perform operations, the operations including:
receiving a paging message, a content carried in the paging message comprising:
a first identity of the terminal device and an identity of an anchor access network device, or
the content carried in the paging message comprising a second identity of the terminal device; and
in response to the content carried in the paging message comprising the first identity of the terminal device and the identity of the anchor access network device, sending a first request message to a first access network device; or
in response to the content carried in the paging message comprises the second identity of the terminal device, sending a second request message to the first access network device, and clearing stored context information,
wherein the first request message is a connection resume request message carrying information of the first identity of the terminal device and information of the identity of the anchor access network device, wherein the first identity of the terminal device identifies the terminal device on the anchor access network device, and wherein the identity of the anchor access network device identifies the anchor access network device in an access network, and
wherein the second request message is a connection establishment request message carries a third identity of the terminal device, wherein the second identity of the terminal device identifies the terminal device in a core network, and wherein the third identity of the terminal device identifies the terminal device in the core network.

16. The non-transitory computer readable storage medium according to claim 15, the operations further comprising:
establishing a connection to the first access network device based on the second request message.

17. The non-transitory computer readable storage medium according to claim 15, the operations further comprising:
resuming a connection to the first access network device based on the first request message.

18. The non-transitory computer readable storage medium according to claim 15, wherein if the second request message is sent, the operations further comprising:
receiving a connection establishment message from the first access network device indicating that the first access network device is unable to determine the anchor access network device based on the information of the identity of the anchor access network device carried in the second request message;
establishing a connection to the first access network device; and
sending a connection establishment complete message to the first access network device, wherein the connection establishment complete message carries connection information of the anchor access network device.

19. The non-transitory computer readable storage medium according to claim 15, wherein the first access network device is corresponding to a cell in which the terminal device is located.

20. The non-transitory computer readable storage medium according to claim 15, wherein the third identity of the terminal device is a non-access stratum (NAS) identifier of the terminal device.

21. The non-transitory computer readable storage medium according to claim 15, the operations further comprising:
in response to the content carried in the paging message comprising the second identity of the terminal device, entering an idle state.

* * * * *

UNITED STATES PATENT AND TRADEMARK OFFICE
CERTIFICATE OF CORRECTION

PATENT NO. : 11,659,613 B2  
APPLICATION NO. : 17/009731  
DATED : May 2, 2023  
INVENTOR(S) : Li et al.

Page 1 of 1

It is certified that error appears in the above-identified patent and that said Letters Patent is hereby corrected as shown below:

In the Specification

In the Detailed Description of Illustrative Embodiments, Column 7, Line 65; delete "MIME" and insert --MME--.

Signed and Sealed this  
Twenty-seventh Day of June, 2023

Katherine Kelly Vidal  
*Director of the United States Patent and Trademark Office*